Feb. 12, 1946.  E. L. WOOD  2,394,958
WHEEL TRIM
Filed Feb. 10, 1944  3 Sheets-Sheet 1
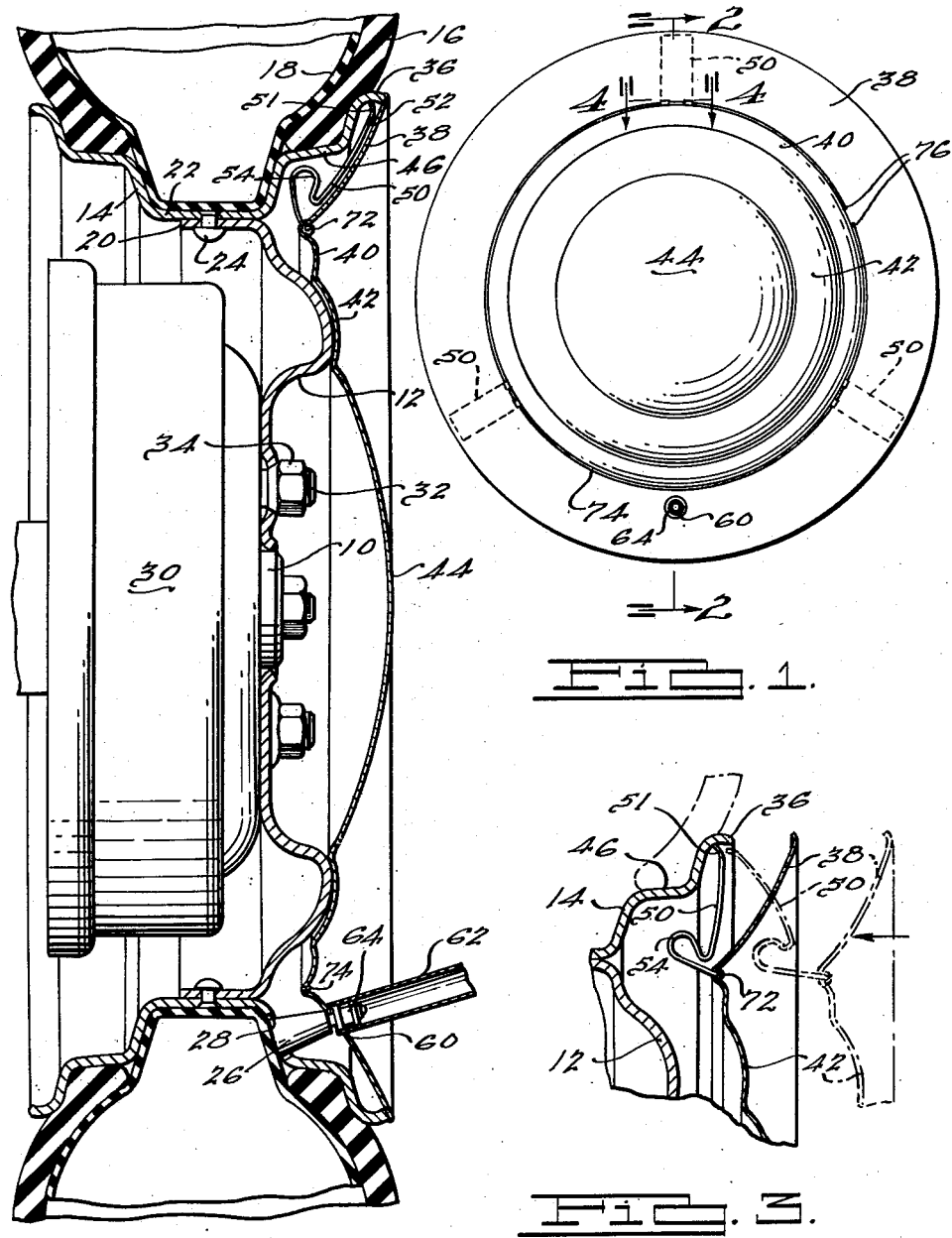
INVENTOR.
Edward L. Wood.
BY
Harness, Dickey & Pierce.
ATTORNEYS.

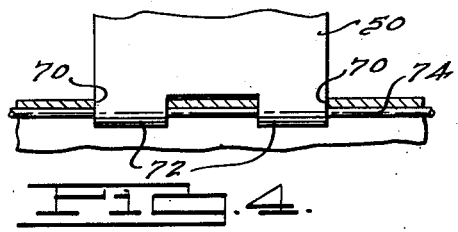
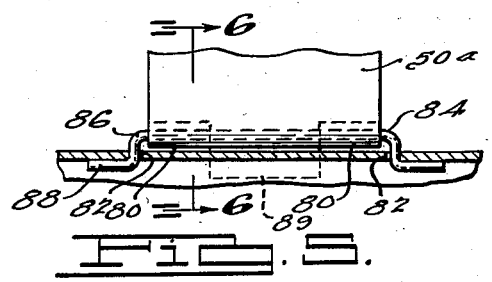
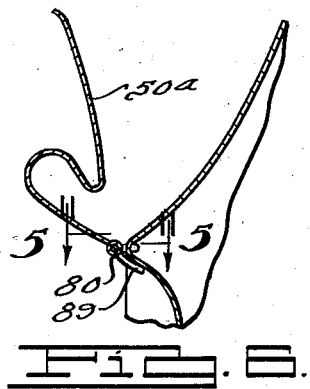
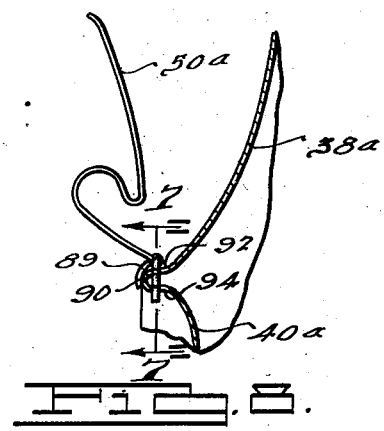
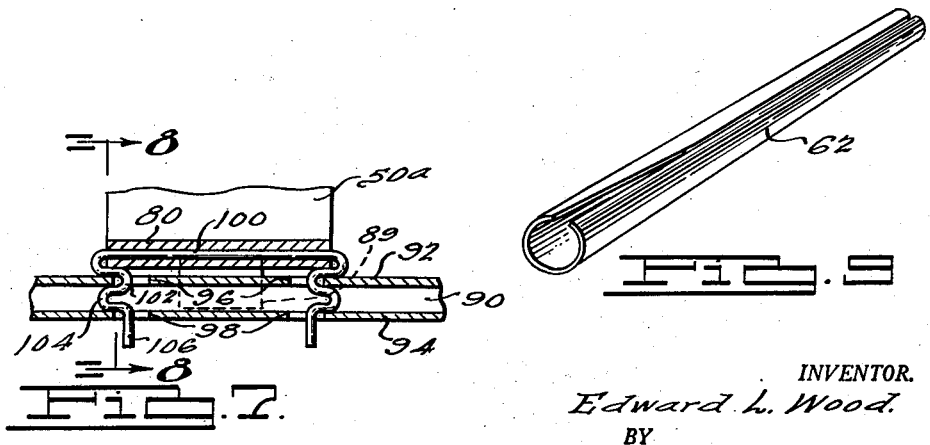

Feb. 12, 1946.　　　E. L. WOOD　　　2,394,958
WHEEL TRIM
Filed Feb. 10, 1944　　　3 Sheets-Sheet 3
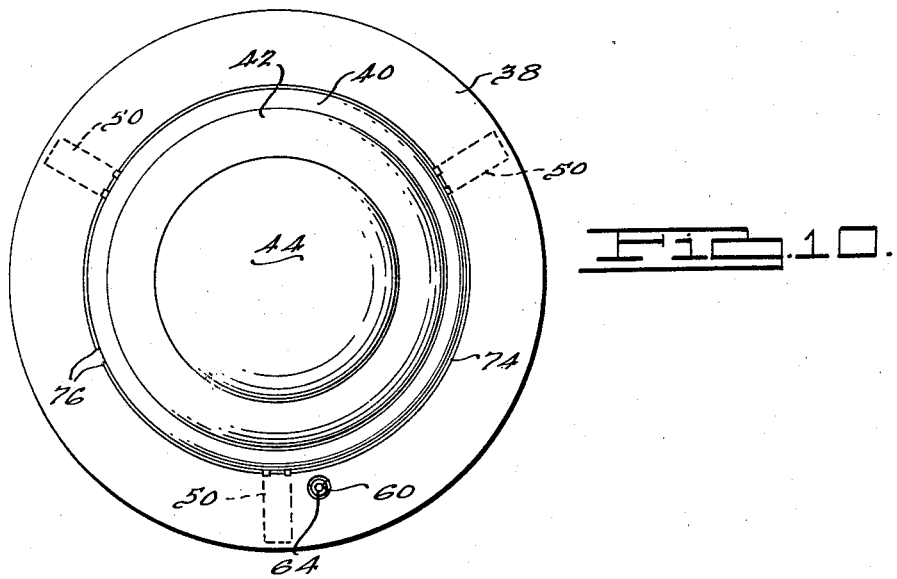
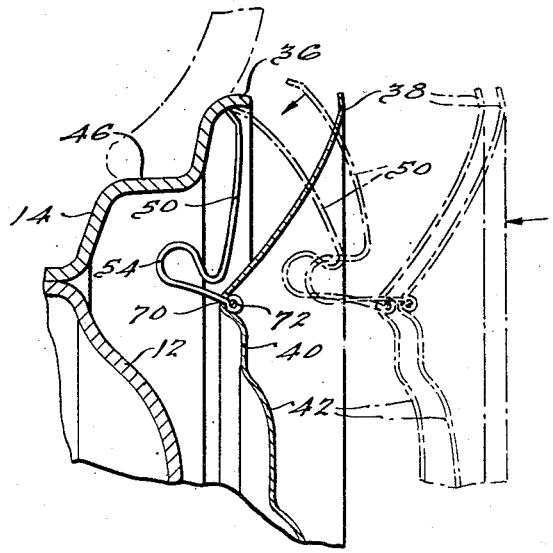
INVENTOR.
Edward L. Wood.
BY
Harness, Dickey & Pierce.
ATTORNEYS.

Patented Feb. 12, 1946

2,394,958

UNITED STATES PATENT OFFICE 2,394,958

WHEEL TRIM

Edward L. Wood, Detroit, Mich.

Application February 10, 1944, Serial No. 521,791

21 Claims. (Cl. 301—37)

This invention relates to decorative covers on trim discs or rings for automobile wheels, that is an ornamental disc or ring applied to the outer side of an automobile wheel in order to concel the true contour of the wheel therebehind and/or provide a more decorative appearance to the wheel, the principal object being the provision of a new and novel means cooperating between the trim and the wheel for securing trim to the wheel.

Objects of the invention include the provision of means for securing a trim disc or ring to an automobile wheel that is simple in construction and positive in operation; the provision of means of the type described unusually free of sensitiveness in its position axially of the wheel without affecting the security of the connection between the trim and the wheel; the provision of a device of the type described so cooperating between the trim and the wheel as to eliminate any partial securement of the trim to the wheel and requiring full securement of the trim to the wheel in any case where the connection is such as to support the trim on the wheel; the provision of means for releasably securing trim to a wheel rim including a spring device cooperating between the rim and the trim so constructed and arranged that it is shortened in length as the trim is applied to the wheel rim and is partially increased in length after passing over a dead center position thereby to resiliently and continuously urge the trim axially inwardly of the wheel; the provision of a construction as last above described in which the spring element is arranged in approximately radial relation with respect to the wheel and the trim; the provision of a construction as above described in which the securing means is carried by the wheel trim; and the provision of means of the type described that is simple in construction, economical to manufacture, and unusually efficient in use.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views;

Fig. 1 is a face view of a wheel trim including means for removably securing it to an automobile wheel;

Fig. 2 is an enlarged section taken axially through the trim shown in Fig. 1 and illustrating it in operative position with respect to an automobile wheel, the latter being shown in fragmentary partially sectioned view;

Fig. 3 is a fragmentary sectional view taken in the same plane as Fig. 2 and illustrating the relation of the parts when the trim is being applied to the wheel;

Fig. 4 is an enlarged, fragmentary sectional view taken on the line 4—4 of Fig. 1 and illustrating the manner in which the spring elements are secured to the trim;

Fig. 5 is a view similar to Fig. 4 but illustrating a modified form of connection between the spring elements and the trim and taken as on the line 5—5 of Fig. 6;

Fig. 6 is a fragmentary sectional view taken on the line 6—6 of Fig. 5;

Fig. 7 is a view similar to Fig. 4 illustrating a further modified form of connection between the spring element and the trim and taken as on the line 7—7 of Fig. 8;

Fig. 8 is a view similar to Fig. 6 and taken as on the line 8—8 of Fig. 7;

Fig. 9 is a perspective view of the tube preferably employed for guiding the trim onto the wheel in proper relation with respect to the valve stem of the wheel;

Fig. 10 is a view similar to Fig. 1 but showing a different positioning of the tire valve receiving opening with respect to the resilient securing means; and, Fig. 11 is a view similar to Fig. 3 but illustrating a slightly different arrangement of the spring arms.

One of the most popular types of wheel trim or trim ring heretofore found on the market has consisted of a ring applied to the axially outer face of the wheel. The ring has a central opening through which the axially inwardly projecting flange of the wheel hub is adapted to pass so that the radially outer marginal portion of the wheel hub will bear against the inner marginal periphery of the trim ring which will thus be held in place upon the wheel when the hub cap is pressed home into operative engagement with the cooperating spring retainer fingers carried by the wheel. There are several practical objections to this means for securing a wheel trim ring in place. One is that while the spring fingers which cooperate between the wheel and the hub cap may be sufficient for securing the hub cap alone to the wheel, the added weight of the wheel trim ring thus imposed upon the spring fingers overloads them with the result that when the wheel receives a heavy jar, as in striking an obstruction in a road and particularly at high speed, the fingers often yield sufficiently to release both the hub cap and the wheel trim ring and in which case they are either lost or damaged. This difficulty may be overcome to a larger extent by the use of an auxiliary spring ring stiffener for the spring fingers on the wheel as disclosed in my United States Patent No. 2,298,669, dated October 13, 1942.

However, even in the latter case there is a still further difficulty in that in positioning the inner marginal edge of the trim or wheel ring under the outer marginal edge of the hub cap the point of connection between the hub cap and the spring fingers is moved axially outwardly by the thickness of the trim ring, which thus renders the connection between the hub cap and the spring fingers less secure than when the trim ring is eliminated. Even this difficulty may be overcome by employing supplementary spring finger elements for the spring fingers so as to move the point of engagement with the hub cap axially outwardly to compensate for the added thickness of the wheel trim ring, all as disclosed in United States Patent No. 2,333,626, issued to C. B. Aske, Jr., and dated November 9, 1943.

It will be appreciated, however, that the devices shown in the patents above identified are in reality artifices resorted to in an attempt to overcome shortcomings in the hub cap securing means itself and, therefore, at the most provides a means for minimizing these shortcomings rather than eliminating them.

Various other types of means for removably and resiliently securing wheel trim rings, disc, or the like to automobile wheels have been suggested but as far as I am aware, these, as in the case of a hub cap securing means above discussed, are all open to another criticism and that is the range of axial movement of the trim from a position in which it is not operatively connected to the wheel to a position in which it is fully connected to the wheel is so small and the arrangement of the securing means with respect to the trim and the wheel is such that a trim may be only partially secured to a wheel without this deficiency being noted, and under such circumstances a relatively light blow of the wheel upon an obstruction in the road may be sufficient to disengage the wheel trim from the wheel and thus cause it to be lost or damaged.

Another difficulty with such securing means, where a small axial movement between released and engaged position is provided, is that should the rim of the wheel hit some obstruction in the road, such as a rock or the like, with sufficient force to dent the lip of the rim and cause it to be bent or bulged outward, it thereafter may prevent the trim or wheel trim ring from moving to its intended fully seating position over such area. In such case it may thereafter be impossible to securely hold the wheel trim ring to the wheel, with the result that it will soon be lost or damaged.

One of the principal objects of the present invention is to provide a means for securing a wheel trim ring, disc, or like trim to a wheel rim in which the axial movement between the wheel trim ring and the wheel in moving the former from a released position to a fully connected position with respect to the latter is so great as to prevent an ordinary person, when applying such a trim to a wheel, from assuming that it is fully applied to the wheel when in fact it is only partially so applied. It is still further and a more ilimited object of the invention to so arrange the wheel securing means and so form them for cooperative relation with respect to the wheel rim that it will not be supported by the wheel at all unless it is completely secured thereto. This last feature positively prevents incomplete securement of the trim to the wheel and consequent loss or damage to the same because of incomplete securement.

The present invention may be applied to wheel trim which is either in the form of a ring or a disc, the latter being shown in the drawings by way of preference and illustration only. When employed in the form of a disc it may be employed over the usual hub cap or the usual hub cap may be eliminated and the disc further employed to perform an equivalent function, this being the construction shown in the drawings by way of preference and illustration. Additionally, the present invention may be employed in connection with trim or wheel trim rings or discs which are of smaller diameter than, or substantially equal in diameter to, the diameter of the cooperating rim. The latter type of construction is shown in the drawings by way of preference and illustration. Furthermore, the spring elements of the present invention may be arranged to cooperate with either a radially inwardly or a radially outwardly facing annular shoulder of an automobile wheel without adversely affecting its proper functioning to any material extent. In the accompanying drawings they are shown as cooperating with a radially inwardly facing shoulder inasmuch as conventional rim structures are already provided with at least one pair of these on each side thereof with which such spring elements may cooperate without the necessity of any change whatever in the wheel structure.

Referring now to the accompanying drawings and particularly to Fig. 2, a conventional wheel is shown as comprising a hub 10, a wheel body 12, and a rim 14 of the usual drop center type, the latter of which carries a conventional tire 16 enclosing a conventional inner tube 18. The wheel body 12 is formed from sheet metal into a more or less disc-like conformation and is formed to provide a concentric cylindrical felloe portion 20 telescoped within the central trough 22 of the rim 14 and secured thereto by means of rivets 24. The inner tube 18 is provided with the usual stem 26 which projects out through a hole 28 formed in the rim 14 so as to expose it for connection to an air hose. The wheel body 12 is secured to the hub 10 through a conventional brake drum 30 fixed to the wheel hub 10 and provided with a concentric annular series of studs 32 which project through the wheel body 12 and receive nuts 34 thereon.

In the particular case shown by way of illustration the wheel trim or disc comprises a disc of relatively thin sheet metal of a diameter substantially equal to the maximum diameter of the rim 14 so as to engage over the free edge of the outwardly turned lip 36 on the outer side of the rim 14. In the particular case shown by way of illustration the trim includes a radially outer annular portion 38 which extends axially and radially inwardly from the lip 36 in approximate parellelism with the outer face of the tire 16 immediately radially outwardly of the lip 36, a concentric annular bead portion 40 integrally joined to the radially inner edge of the portion 38 through a relatively short curve, an outwardly bowed concentric annular portion 42 joined to the radially inner edge of the portion 40 and finally an outwardly curved or bulged concentric central portion 44 of a size approximately corresponding to that of a conventional hub cap and integrally joined to the radially inner edge of the portion 42. Although not necessary in the practice of the present invention the cross-sectional curvature of the wheel trim is such, in the particular case shown, that its outer peripheral edge bears against the free edge of the lip 36 while the radially inner margin of the portion 42 bears against the wheel body 12 as shown.

In accordance with the present invention the wheel trim thus described is connected to the wheel by means of a plurality of spring members or elements arranged generally radially of the trim and the wheel and pivotally secured to one of them, the construction and arrangement being such that at the moment of initial application of the wheel trim to the wheel the point of connection of each spring element with the wheel trim is positioned in a plane spaced axially outwardly of the wheel from the point of connection of the spring elements with the wheel, the spring elements being compressed longitudinally, or shortened, as the trim is pressed axially inwardly of the wheel during application until it passes over a dead center position in which the points of contact between the spring elements and both the trim and wheel lie substantially in the same plane. Further inward movement of the trim projects the points of connection of the spring elements with the trim axially inwardly of its points of connection with the wheel, allowing the spring elements to partially elongate and thereafter constantly act to hold the trim securely in place on the wheel.

In the broader aspects of the present invention such spring elements may take a variety of shapes and be of a variety of constructions. For instance, each may comprise a pair of rigid telescoping parts constantly urged longitudinally away from each other by means of a cooperating coil spring or the like or it may be formed from leaf spring stock of such configuration as to permit relative ready contraction of its length upon the application of suitable pressure in such direction. This latter form of construction is shown in the drawings as preferred both because of its cheapness and because of its adaptability to changes in shape to accommodate different amounts and arrangements of space between the trim and the wheel rim provided for it and which space may vary relatively widely due to varying cross-sectional configurations of the trim or the wheel rim itself.

Where the trim is of smaller diameter than the maximum diameter of the rim then the spring elements will ordinarily cooperate between the wheel trim and the outer base flange 46 of the rim 14, or equivalent either radially outwardly or inwardly facing shoulder of the wheel, but where the trim is of substantially the same diameter as the wheel rim as in the case shown then preferably the spring elements will cooperate between the lip 36 of the rim 14 and the wheel trim as shown.

Furthermore, while such spring elements may equally well be pivotally secured to either the wheel or to the wheel trim and cooperate between them in the manner above described it will ordinarily be preferable that they be secured to the wheel trim as this will ordinarily be preferable for well understood reasons and, accordingly, this is the type of construction shown in the drawings.

In the particular embodiment of the spring element shown it will be observed that it comprises a strip of spring metal indicated generally at 50, one end of which is shown pivotally connected to the trim and the other end of which when in operative engagement with the rim 14 bears against the radially inner surface of the lip 36 of the rim 14. It includes a radially outer elongated and slightly curved portion 52 arranged in substantial parallelism with the portion 38 of the wheel trim when the latter is in operative relation with respect to the rim 14, and a generally S-shaped or reversed loop portion 54 adjacent the radially inner end thereof. The free end of the portion 52 is preferably bent axially inwardly of the wheel a small amount as at 51 as this has been found to improve its grip on the lip 36. It will be observed that the point of pivotal connection of the spring element with the wheel trim when the latter is in operative relation with respect to the rim 14 is spaced axially inwardly of the point of contact between its radially outer end and the lip 36. In this position of the parts, that is where the wheel trim is operatively associated with respect to the wheel as illustrated in Fig. 2, the spring element 50 is held in a compressed state between its point of connection with the wheel trim and the lip 36 of the rim. There being three or more such spring elements 50 preferably equally angularly spaced about the wheel, it will be appreciated that the axial compressive forces therein tend to constantly urge the wheel trim axially inwardly with respect to the wheel, such axial inward movement of the wheel trim being limited only through its contact with either the free edge of the lip 36 of the rim 14 which is ordinarily preferable, by contact of the portion 42 with the wheel body 12, or by both in the particular case shown in Fig. 2. Furthermore, the spring elements 50 are preferably of equal length and of equal compressive strength in the general direction of the length thereof and being secured to the wheel trim on a line concentric therewith so that they tend to maintain the wheel trim concentric with the rim 14.

In initially applying the wheeel trim to the rim 14 the spring elements 50 are first pivoted inwardly to a position in which their outer ends, and while they are in free and unstressed condition, lie in the particular case shown in Fig. 3 and as brought out by dotted lines within a circle whose effective diameter is less than the inner diameter of the lip 36 of the rim, and the wheel trim is then applied to the rim with the radially outer or free ends of the spring elements 50 all received within the lip 36 of the rim as indicated by dotted lines in Fig. 3. The trim is then pressed axially inwardly of the wheel during which time the linear distance between the point of connection of each spring element 50 with the wheel trim, and its point of contact with the inner face of the lip 36, is shortened until, as illustrated in full lines in Fig. 3, the point of pivotal connection of each spring element with the wheel trim lies in the same plane as the point of engagement of the spring elements with the inner face of the lip 36, at which time the spring elements 50 have been lengthwise compressed to their maximum extent.

It will be observed from an inspection of Fig. 3 that where the spring elements 50 are of appreciable length as in the case shown, upon completion of this initial movement of the wheel trim 50 axially of the wheel the spacing between the trim and rim is still relatively great and in actual practice is preferably, although not necessarily, in excess of one-half of one inch. This is preferable for the reason that in event more than three spring elements 50 are employed, in which case it might be possible to partially connect the wheel trim to the rim and in such a manner that it might temporarily maintain its partial connection, the outward spacing of a portion of the periphery of the wheel trim from the rim would be immediately observed by the ordinary person applying the wheel trim and correct it. In conventional constructions or other constructions heretofore proposed as previously mentioned, the equivalent amount of movement between partially engaged and fully engaged positions between the wheel trim and the rim is so small that an incomplete engagement is often passed unnoticed, with the result that the trim falls off when the first severe bump is thereafter experienced by the wheel.

After the wheel trim has reached the point of partial engagement with the wheel rim illustrated in full lines in Fig. 3, it will be appreciated that a small further movement which will move the points of connection between the spring elements 50 and the wheel trim axially inwardly of their points of connection with the lip 36 and the spring elements 50 will immediately exert a resilient force tending to push the trim axially inwardly of the wheel and this effect will immediately cause the trim to be drawn axially into fully contacting relation with respect to the wheel, thus securely but resiliently holding it in place. Where the additional amount of movement from the position illustrated in full lines in Fig. 3 to that illustrated in full lines in Fig. 2 is required for full seating of the wheel trim, it will be appreciated that it will be substantially impossible to accidentally thereafter displace the wheel trim from the wheel as long as the spring elements 50 are operative.

This same feature is invaluable in case the lip 36 of the rim is bent outwardly through contact in operation with some hard object such as a stone or the like as in such case it will be appreciated that although the wheel trim may be held outwardly from full engagement with a portion of the lip 36 of the rim, and by an amount which would render many types of constructions heretofore proposed entirely inoperative, the spring elements 50 will in the case of the present invention still maintain the wheel trim securely in place. This feature is of further importance in those cases where balancing weights are applied to the rim of the wheel as in such case they are applied over the lip 36 of the rim and serve to space the corresponding portion of the trim outwardly away from the rim. The amount of spacing in such case is so small in comparison to the total distance necessary to project the wheel trim outwardly beyond the point of maximum compresson of the spring element 50 as to be inconsequential as far as the security of the connection between the wheel trim and the rim of the present invention is concerned.

When it is desired to remove the wheel trim, as is necessary in the case shown in order to remove the wheel from the automobile by removal of the nuts 34, a screw driver or other instrument may be forced between the periphery of the wheel trim and the free edge of the lip of 36 until the wheel trim is separated therefrom a sufficient distance for a person to grip the periphery of the wheel trim with his fingers, upon which it may be simply and quickly pulled off of the wheel, the spring elements 50 in such case simply operating in reverse to that described in applying the wheel trim to the wheel. One thing to be noted is that by employing spring elements of the type herein described and particularly where there is the large amount of axial movement between the two different positions indicated in full lines in Figs. 2 and 3, the amount of force required to be exerted by the spring elements is materially less than required, for instance, between the spring fingers in the hub cap in the patented constructions previously identified, and yet results in a much securer connection. As a result the wheel trim may be applied and removed from the wheel in a more facile manner than in such prior constructions.

In the above description it has been assumed that in applying or removing the trim the plane of its peripheral edge is maintained parallel to the plane of the lip 36 of the rim. It will be appreciated that this has been done for ease of description only as one edge of the trim may be moved into contact with the rim or wheel in advance of the diametrically opposite edge thereof during application to the rim, and may be pulled out of contact during removal from the rim, without affecting the described functioning of the spring elements, and in fact this uneven application and removal will be the usual procedure in practice.

There is a particular advantage in connection with the present invention in employing only three spring elements 50 equally angularly spaced from each other about the axis of the wheel trim and wheel and the reason for this will now be explained. Where only three of such elements are employed it will be appreciated that it is impossible to apply the wheel trim to the wheel through action of two of the spring elements only for in such case the compressive force exerted through such two elements will force the wheel trim off center with respect to the wheel, and which will be immediately visibly apparent to one applying the wheel trim. Additionally where the diameter of the free ends of the springs 50 when in the position shown by dotted lines in Fig. 3 is less than the diameter of the lip 36 as shown, it will positively prevent the wheel trim from even being temporarily or partially connected to the wheel for in such case that portion of the wheel trim at and adjacent the third spring element which is not operatively engaged with the rim will immediately fall axially outwardly of the rim if it is positioned at the top of the wheel, and if positioned at any point below the axis of the wheel will permit the entire wheel trim to drop bodily away from the wheel. This is believed to be a peculiarity of the present invention which will not be found in any other type of wheel trim securing means heretofore suggested and is invaluable in insuring either complete securement of the trim to the wheel, or none at all.

From the above it will be appreciated that in effect the present invention provides a connection between the wheel trim and the rim comprising generally radially directed spring toggle elements which pass over a center in being moved between connected and disconnected positions and which, because of this character, provides an exceptionally simple type of connection yet one in which the security of the connection between the trim and the wheel is unusually great. Furthermore, where three equally angularly arranged toggle elements are employed and arranged as heretofore explained it prohibits incomplete engagement between the trim and the wheel whenever the former is applied to the latter.

Because of the relatively great axial distance which the wheel trim must travel in accordance with the present invention in passing from free to applied position on the wheel, it would be difficult, unless special means were provided to overcome it, to align the valve stem 26 with the hole 60 in the trim through which it must project when the trim is in operative engagement with the wheel. This is particularly true of the construction brought out in Fig. 3. To facilitate this alignment, in accordance with this phase of the present invention a tube 62, best shown in Fig. 9 and preferably comprising a strip of metal bent into tubular form, is employed. The strip of metal from which the tube 62 is formed is preferably of relatively thin gage and the free edges of the strip which come into abutting or approximately abutting relationship are preferably not permanently fixed together. The main body of the tube 62 is preferably of a diameter too small to enable it to pass over the cap 64 for the valve stem 26 but at one end it is gradually increased in diameter as illustrated in Fig. 9 so that such end may be pressed over the valve cap 64 and be slightly expanded in doing this. This permits the tube 62 to resiliently grip the valve cap 64 and maintain its position thereon. Then in applying wheel trim to the wheel the tube 62 is first applied to the valve cap 64 and the free end of the tube is projected through the hole 60 in the wheel trim, upon which the wheel trim may be moved inwardly and forced into position on the wheel with the assurance that the stem 26 is aligned with the hole 60. The tube 62 is then removed and suitably stored until it is again required in the application of a trim to the wheel.

So far nothing has been said about the mode of connection between the spring elements 50 and the trim. It will be appreciated that there are a number of different types of connections that may be desirably employed for this purpose and three different types are shown in the drawings by way of illustration. In the construction illustrated in Figs. 1 to 4, inclusive, the wheel trim in radial alignment with each of the spring elements 50 is provided with a pair of contiguous slots 70 in the bottom of the groove formed by the sharp reversely bent portion connecting the portions 38 and 40 of the trim. The radially inner ends of the spring elements 50, and as best brought out in Fig. 4, are formed to provide a pair of eyes 72 spaced in accordance with the spacing of the slots 70 and projected through such slots to the outer face of the wheel trim. A light split spring ring 74 of the same diameter as the groove formed at the junction of the portions 38 and 40 of the wheel trim seats in such groove and projects through the eyes 72 as brought out in the various figures, the free ends of the rings 74 being bent inwardly to the rear face of the wheel trim through suitable openings provided therein for reception of the same as indicated at 76 in Fig. 1. The split ring 74, therefore, provides a pivot pin for connecting the various spring elements 50 to the wheel trim, the width of the slots 70 measured radially of the trim, of course, determining the extent of free pivotal movement of the spring elements 50 on the ring 74 and preferably limiting inward movement thereof to approximately the position indicated in dotted lines in Fig. 3, thereby to facilitate the application of the trim to the wheel. The arrangement of the slots 70 are preferably such that contact between the spring elements 50 and the radially inner edges of the slots limits pivotal movement of the elements 50, in a counter-clockwise direction of movement to substantially that shown in Fig. 3, where such position is desired. It might also be noted that in this construction, as well as in the other hinge constructions shown, that sufficient friction is preferably set up in the hinge joints to hold the spring elements 50, or their equivalents, in the position indicated by dotted lines in Fig. 3 so as to prevent them from swinging under their own weight, and thus facilitate the application of the trim to the wheel.

A different method of securing the spring element 50 to the wheel trim is illustrated in Figs. 5 and 6, the spring elements here being indicated at 50a, it being understood that they are identical to the construction first described except for the formation of their inner ends to adapt them to this modified form of securement. As illustrated in Figs. 5 and 6 the radially inner end of the spring elements 50a are bent to form a pair of spaced eye portions 80 the same as in Fig. 4. Two holes 82 are formed through the wheel trim at the bottom of the trough formed between the portions 38 and 40 immediately outwardly of each side of each element 50a. A wire 84 is projected through the eyes 80 and is relatively rotatable therein and the opposite ends of the wire 84 are first bent rearwardly as at 86 and projected through the corresponding holes 82 and then longitudinally in parallelism with the central portion thereof as at 88 so as to lie against the bottom of the trough formed between the portions 38 and 40 of the trim. The ends 88 may be made relatively short and, therefore, not readily apparent on the face of the trim. Preferably there is enough friction between the eyes 80 and the wire 84 to prevent free swinging of the element 50a. Also, in this case, in order to limit swinging of the element 50a away from the trim, the metal of the element 50a between the eyes 80 is not cut out as in the first described construction but instead is extended as at 89 beyond the hinge axis as best brought out in Fig. 6, and forms a tongue or stop which engages the inner face of the trim.

In Figs. 7 and 8 a still further modified form of construction is shown. In this case the same spring elements 50a as used in Figs. 5 and 6 may be employed except that the tongue or stop portion may require modification. The wheel trim itself is slightly modified from that shown in the preceding structures but only at the point of connection between the portions 38 and 40 of the previous structures. Accordingly, the portion 38a may be considered to be substantially identical to the portion 38 first described and the portion 40a substantially identical to the portion 40 first described, the difference being that the groove or trough formed at the point of connection of these portions is materially deepened as illustrated at 90 in Fig. 8 so as to provide two approximately parallel and spaced wall portions 92 and 94. In this modification the walls 92 and 94 are provided with aligned openings or slots 96 and 98, respectively, therein approximately in alignment with the outer edges of the corresponding spring elements 50a. In this case a somewhat U-shaped clip is provided having a straight central portion 100 rotatably and preferably frictionally received in the eye 80 of the corresponding spring element 50a and each end of the clip is then bent to provide first a laterally outwardly directed U portion 102 and then a laterally inwardly directed U-shaped portion 104, the latter terminating in inwardly projecting straight portions 106. It will be noted that the tongue 89 in this construction is somewhat modified from that shown in Fig. 6 to adapt it to the change in form of the connection between the portions 38 and 40 of the trim. With this type of construction the ends 106 are simply projected through their corresponding holes 96 in applying an element 50a to the wheel trim, the ends yielding inwardly toward one another so as to permit the inwardly directed U portions 104 to pass downwardly through the holes 96 upon which they spring out away from one another so as to be projected between the walls 92 and 94 and at the same time to engage the wall 92 within the outwardly facing U portions 102, thereby securely locking the clip and consequently the spring element 50a to the wheel trim. This form of connection is particularly desirable where it is desired to ship the trim without the spring elements 50a operably secured in place thereon, this feature being preferable from the standpoint that it permits a set of such wheel trims to be shipped in a smaller package than would otherwise be possible and with less risk of marring the finish thereof.

The necessity of employing the tube 62 for aligning the hole 60 in the trim with the valve stem 26 when applying the trim to the wheel may be eliminated if, as illustrated in Fig. 10, the hole 60 is placed in closely adjacent relationship with respect to one of the spring elements 50. In this case, when applying the trim to the wheel, that edge of the trim closest to the opening 60 may be pressed axially inwardly of the wheel approximately to its final position before the opposite edge of the trim is pushed into place. This method of application is greatly facilitated if the hole 60 is placed adjacent one of the spring elements 50 as illustrated in Fig. 10 as in such case it is only necessary to overcome a portion of the force required to finally compress the spring elements 50 nearest the hole 60 during initial stages of the application. It will be understood that the construction illustrated in Fig. 10 is identical to that illustrated in Fig. 1 except for the relative location of the hole 60 with respect to the spring element 50.

The application of the wheel trim to the wheel as just described may be further facilitated if, as illustrated in Fig. 11, the engagement between the spring elements 50 and the slots 70 in the wheel trim through which they project is slightly modified from that illustrated in Fig. 3. This is brought out in Fig. 11 which is a view substantially the same as that illustrated in Fig. 3 except modified to bring out this modified form of engagement.

It was explained in connection with Fig. 3 that the outer ends of the spring elements 50 when moved to the full extent of their pivotal movement away from the wheel trim were arranged in a circle whose diameter was slightly less than the internal diameter of the lip 36 of the rim 14 so that the ends of the spring elements 50 could be freely projected to within the lip 36. It was explained that this feature had the advantage that the wheel trim could not be partially engaged with the wheel and this feature does have a real advantage. However, where it is desired to dispense with the locating tube 62 then, as illustrated in Fig. 11, the engagement of the spring elements 50 with the corresponding slots 70 in the wheel trim preferably limits the inward swing of the spring elements 50 away from the wheel trim to approximately the position illustrated in the righthand dotted position of Fig. 11. It will be observed from such view that the free end of the spring elements 50 project radially outwardly beyond the lip 36 of the rim 14 and in such case, in applying the wheel trim to the wheel, the outer end of one or more of the spring elements 50 must be bent inwardly before the free ends of all of the spring elements 50 may be projected to within the lip 36 of the rim 14. Preferably the amount of force necessary to thus bend the free ends of the spring elements 50 in order for them to be received within the lip 36 of the rim 14 is sufficient to lightly and temporarily support the wheel trim on the rim. Under such conditions the free ends of the spring elements 50 may be projected to within the lip 36, the wheel trim thus being lightly supported through this engagement on the wheel, and the wheel trim may then be rotated until the hole 60 in the wheel trim is aligned with the valve stem 26, whereupon that edge of the trim nearest the hole 60 may be pressed inwardly until the valve stem projects through the hole 60, upon which the entire trim may be pressed inwardly thus to complete its securement to the wheel.

Formal changes may be made in the specific embodiments of the invention described without departing from the spirit or substance of the broad invention, the scope of which is commensurate with the appended claims.

What is claimed is:

1. In a wheel trim, in combination, a circular member adapted for application to an automobile wheel, and a plurality of longitudinally resilient devices arranged in angularly spaced relation to each other about the axis of said member and each pivoted at one end thereto about a line extending transversely of a line radial to said member and passing through the pivotal connection.

2. In a wheel trim, in combination, a circular member adapted for application to an automobile wheel, and a plurality of leaf spring elements arranged in angularly spaced relation to each other about the axis of said member and each pivoted at one end thereto about a line extending transversely of a line radial to said member and passing through the pivotal connection.

3. In a wheel trim, in combination, a circular member adapted for application to an automobile wheel, and a plurality of longitudinally compressible generally radially directed leaf spring toggle elements arranged in angularly spaced relation to each other about the axis of said member and secured thereto for movement of the free end portions thereof toward and away from said member.

4. In a wheel trim, in combination, a circular member adapted for application to an automobile, and a plurality of longitudinally compressible generally radially directed leaf spring elements arranged in angularly spaced relation to each other about the axis of said member and secured thereto for movement of the free end portions thereof toward and away from said member and each pivoted at one end thereto about a line approximately tangent to a circle concentric with said member.

5. In a wheel trim, in combination, a circular member adapted for application to an automobile wheel, and a plurality of longitudinally compressible leaf spring elements arranged in angularly spaced relation to each other about the axis of said member and each pivoted at one end thereto about a line approximately tangent to a circle concentric with said member, the free end portions of each of said elements being angularly displaced from alignment with the general direction of the length thereof away from said member.

6. In a wheel trim, in combination, a circular member adapted for application to an automobile wheel, and a plurality of longitudinally compressible generally radially directed leaf spring elements arranged in angularly spaced relation to each other about the axis of said member and secured thereto for movement of the free end portions thereof toward and away from said member and each pivoted at one end thereto about a line approximately tangent to a circle concentric with said member, said spring elements cooperating with said member to limit the extent of pivotal movement thereof away from said member.

7. In a wheel trim, in combination, a circular member adapted for application to an automobile wheel, a plurality of longitudinally compressible generally radially directed leaf spring elements arranged in angularly spaced relation to each other about the axis of said member and secured thereto for movement of the free end portions thereof toward and away from said member and each pivoted at one end thereto about a line approximately tangent to a circle concentric with said member, and means cooperating between said member and said spring elements operable to limit pivoting movement of said elements away from said member.

8. In a wheel trim, in combination, a circular member adapted for application to an automobile wheel, a plurality of longitudinally resilient device arranged in angularly spaced relation to each other about the axis of said member, and a frictional hinge joint between one end of each of said devices and said member.

9. In a wheel trim, in combination, a circular member adapted for application to an automobile wheel, a plurality of longitudinally resilient devices arranged in angularly spaced relation to each other about the axis of said member, and means pivotally connected to one end of each of said devices connecting said devices to said member.

10. In a wheel trim, in combination, a circular member adapted for application to an automobile wheel, a plurality of longitudinally resilient devices arranged in angularly spaced relation to each other about the axis of said member, and means pivotally connected to one end of each of said devices and releasably connected to said member serving to pivotally mount said devices on said member.

11. In a wheel trim, in combination, a circular member adapted for application to an automobile wheel, a plurality of longitudinally resilient devices arranged in angularly spaced relation to each other about the axis of said member, one end of each of said devices projecting through said member, and means pivoted to said ends serving to connect said devices to said member.

12. In a wheel trim, in combination, a circular member adapted for application to an automobile wheel, a plurality of longitudinally resilient devices arranged in angularly spaced relation to each other about the axis of said member, one end of each of said devices projecting through said member, and means pivoted to said ends and projecting through said member serving to connect said devices to said member.

13. In a wheel trim, in combination, a circular member adapted for application to an automobile wheel, and three longitudinally resilient devices arranged in substantially equally angularly spaced relation to each other about the axis of said member and each pivoted at one end thereto about a line extending transversely of a line radial to said member and passing through the pivotal connection.

14. A trim for an automobile wheel having a generally radially facing annular surface concentric with the axis of said wheel, comprising a circular member adapted for concentric application to the face of said wheel, and a plurality of longitudinally resilient devices arranged in angularly spaced relation about the axis of said member adapted to be located between said member and said annular surface of said wheel, one end of each of said devices operatively engaging said member and extending in a generally radial direction therefrom and the opposite end of each of said devices being substantially free to move axially of said member a material distance on either side of a plane perpendicular to the axis of said member and intersecting the points of connection between said device and said member, said devices being of a free length greater than the radial distance between their points of engagement with said member and said annular surface of said wheel when said member is applied to said wheel, and said points of engagement being displaced axially inwardly of said wheel from the points of engagement of said devices with said annular surface when said member is applied to said wheel, whereby said devices resiliently hold said member to said wheel.

15. A trim for an automobile wheel having a generally radially facing annular surface concentric with the axis of said wheel, comprising a circular member adapted for concentric application to a face of said wheel, and a plurality of longitudinally resilient devices arranged in angularly spaced relation about the axis of said member adapted to be located between said member and said annular surface, one end of each of said devices operatively engaging said member substantially on a circle concentric with the axis of said member and extending in a generally radial direction therefrom and the opposite end of each of said devices being substantially free to move axially of said member a material distance on either side of a plane perpendicular to the axis of said member and intersecting the points of connection between said device and said member, said devices being of a free length greater than the radial distance between said circle of engagement and said annular surface of said wheel when said member is applied to said wheel, and said circle of engagement being displaced axially inwardly of said wheel from the circle of engagement and said devices with said annular surface when said member is applied to said wheel whereby said devices resiliently hold said member to said wheel.

16. A trim for an automobile wheel having a generally radially facing annular surface concentric with the axis of said wheel, comprising a circular member adapted for concentric application to a face of said wheel, and a plurality of longitudinally resilient devices arranged in angularly spaced relation about the axis of said member adapted to be located between said member and said annular surface, one end of each of said devices being pivotally connected to said member substantially on a circle concentric with said member each about a line extending transversely of a line radial to said member and passing through the pivotal connection and extending in a generally radial direction from its point of pivotal connection with said member, said devices being of a free length greater than the radial distance between said circle and said annular surface of said wheel when said member is applied to said wheel, and said circle being located axially inwardly of said wheel from the circle of engagement of said devices with said annular surface when said member is applied to said wheel whereby said devices resiliently hold said member to said wheel.

17. A trim for an automobile wheel having a generally radially facing annular surface concentric with the axis of said wheel, comprising a circular member adapted for concentric application to a face of said wheel, and a plurality of longitudinally resilient devices arranged in angularly spaced relation about the axis of said member adapted to be located between said member and said annular surface, one end of each of said devices being pivotally connected to said member substantially on a circle concentric with said member each about a line extending transversely of a line radial to said member and passing through the pivotal connection and extending in a generally radial direction from its point of pivotal connection with said member, said devices being of a free length greater than the radial distance between said circle and said annular surface of said wheel when said member is applied to said wheel, and said circle being located axially inwardly of said wheel from the circle of engagement of said devices with said annular surface when said member is applied to said wheel whereby said devices resiliently hold said member to said wheel, and means cooperating between said devices and said member limiting pivotal movement thereof away from said member when disconnected from said wheel.

18. A trim for an automobile wheel having a generally radially facing annular surface concentric with the axis of said wheel, comprising a circular member adapted for concentric application to a face of said wheel, and a plurality of longitudinally resilient devices arranged in angularly spaced relation about the axis of said member adapted to be located between said member and said annular surface, one end of each of said devices being pivotally connected to said member substantially on a circle concentric with said member each about a line extending transversely of a line radial to said member and passing through the pivotal connection and extending in a generally radial direction from its point of pivotal connection with said member, said devices being of a free length greater than the radial distance between said circle and said annular surface of said wheel when said member is applied to said wheel, and said circle being located axially inwardly of said wheel from the circle of engagement of said devices with said annular surface when said member is applied to said wheel whereby said devices resiliently hold said member to said wheel, and means cooperating between said devices and said member limiting pivotal movement thereof away from said member when disconnected from said wheel to a position in which the free ends of said devices lie substantially on a circle whose diameter is substantially no greater than the diameter of said surface.

19. A trim for an automobile wheel having a generally radially facing annular surface concentric with the axis of said wheel, comprising a circular member adapted for concentric application to a face of said wheel, and a plurality of longitudinally resilient devices arranged in angularly spaced relation about the axis of said member adapted to be located between said member and said annular surface, one end of each of said devices being pivotally connected to said member substantially on a circle concentric with said member each about a line extending transversely of a line radial to said member and passing through the pivotal connection and extending in a generally radial direction from its point of pivotal connection with said member, said devices being of a free length greater than the radial distance between said circle and said annular surface of said wheel when said member is applied to said wheel, and said circle being located axially inwardly of said wheel from the circle of engagement of said devices with said annular surface when said member is applied to said wheel whereby said devices resiliently hold said member to said wheel, and means cooperating between said devices and said member limiting pivotal movement thereof away from said member when disconnected from said wheel to a position in which the free ends of said devices lie substantially on a circle whose diameter is greater than the diameter of said surface.

20. A trim for an automobile wheel having a rim provided with an axially outwardly directed lip at a peripheral margin thereof, comprising a circular member adapted for concentric application to the face of said wheel, and a plurality of longitudinally resilient devices arranged in substantially equally angularly spaced relation about the axis of said member adapted to be located between said member and said lip, means pivotally connecting one end of each of said devices to said member substantially on a circle concentric with the axis of said member, said devices extending in a generally radial direction from their point of connection with said member and being of a free length greater than the radial distance between said circle and said lip when said member is applied to said wheel, and said circle of engagement being located axially inwardly of said wheel from said lip when said member is applied to said wheel whereby said devices act to resiliently hold said member to said wheel.

21. A trim for an automobile wheel having a generally radially facing surface concentric with the axis of said wheel, comprising a circular member adapted for concentric application to a face of said wheel, and a plurality of toggle springs adapted to be operably engageable between said member and said surface to secure, when in one position thereof, said member to said wheel.

EDWARD L. WOOD.